US005090610A

United States Patent [19]

Bernt et al.

[11] Patent Number: 5,090,610

[45] Date of Patent: Feb. 25, 1992

[54] KILN LINER

[76] Inventors: Jorgen O. Bernt, 241 Cardinal Dr., Oakville, Ontario, Canada, L6J 4P1; Barry C. Forster, 1889 Pagehurst Ave., Mississauga, Ontario, Canada, L4X 1Y6; Allan J. Blain, 1635 Snake Road R.R. #1, Waterdown, Ontario, Canada, L0R 2H1

[21] Appl. No.: 684,266

[22] Filed: Apr. 12, 1991

Related U.S. Application Data

[62] Division of Ser. No. 597,032, Oct. 15, 1990, Pat. No. 5,033,959.

[51] Int. Cl.[5] .......................... B23K 37/04; F27B 7/14

[52] U.S. Cl. .......................... 228/138; 228/118; 432/118

[58] Field of Search .......................... 228/120, 118, 138; 432/118, 119

[56] References Cited

U.S. PATENT DOCUMENTS

| | | | |
|---|---|---|---|
| Re. 16,599 | 4/1927 | Mattice | 228/119 |
| 4,172,701 | 10/1979 | Bernt | 432/118 |
| 4,244,687 | 1/1981 | Bernt et al. | 432/118 |
| 4,373,910 | 2/1983 | Bernt | 432/118 |
| 4,615,477 | 10/1986 | Spada et al. | 228/119 |

FOREIGN PATENT DOCUMENTS

| | | | |
|---|---|---|---|
| 571687 | 10/1977 | U.S.S.R. | 432/118 |

OTHER PUBLICATIONS

Lyndon B. Johnson Space Center, "Alumina Barrier for Vacuum Brazing," 1980, p. 106.

*Primary Examiner*—Richard K. Seidel
*Assistant Examiner*—Jeanne M. Elpel

[57] ABSTRACT

A method of assembling a rotary kiln that has steel plates lining the kiln which overlie an insulation layer, and which are mounted on hangers projecting through the plates.

6 Claims, 4 Drawing Sheets

KILN LINER

Figure 1:
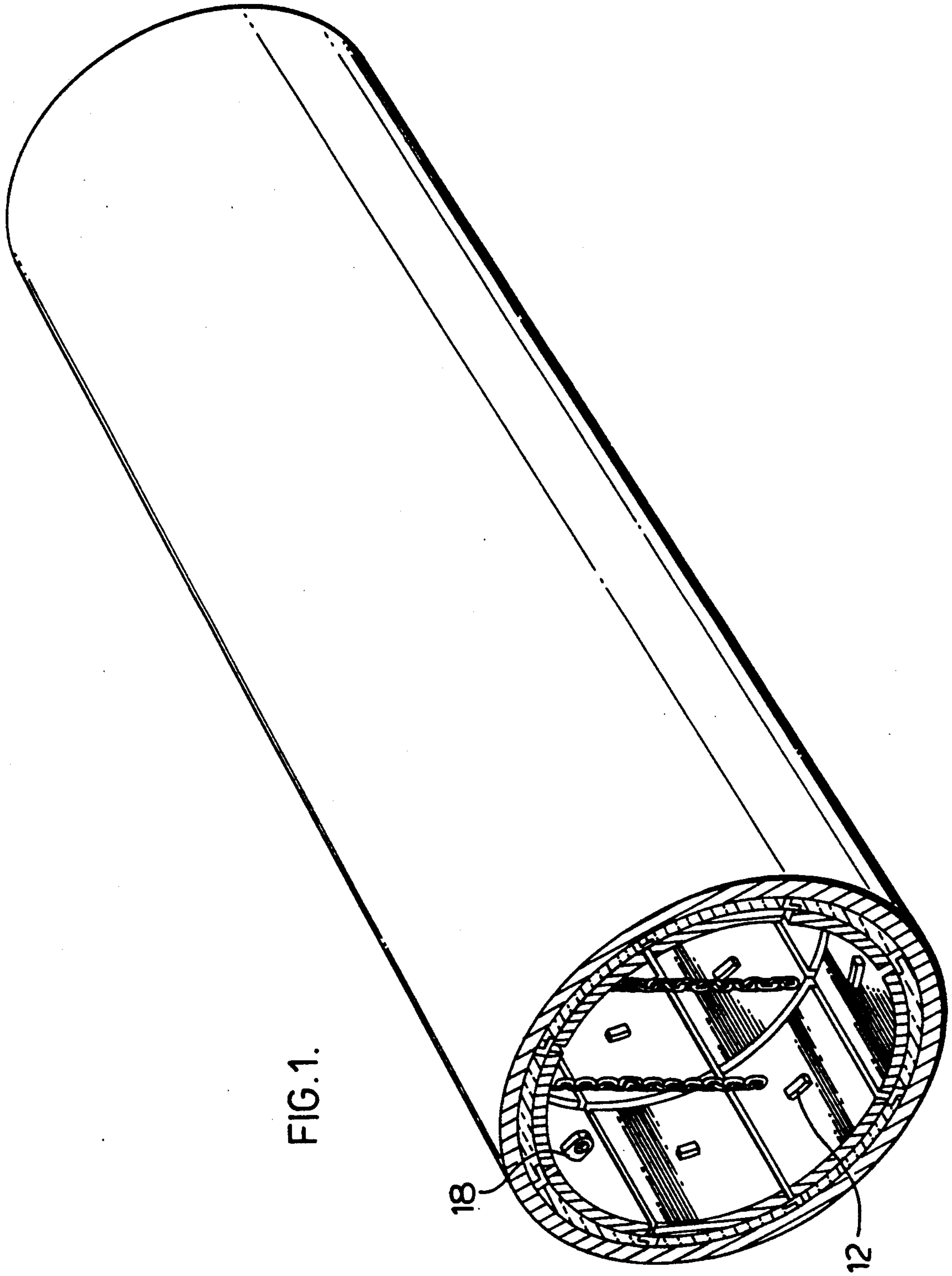

This application is a division of application Ser. No. 07/597,032, filed Oct. 15, 1990, now U.S. Pat. No. 5,033,959.

This invention relates to kiln assemblies and to liners therefore and to methods of making such assembly.

The kiln assemblies which are the subject of this application involves a steel cylinder rotatable about its axis, with the axis sloping at a relatively small angle to the horizontal. Particulate material travels downwardly through the cylinder. Heating, cooling or reactive gases travel upwardly through the cylinder. Metal chains are frequently provided in the chamber which act as heat exchange media between the gases and the particulate matter. The chains also act as a partial) dust curtain to reduce the quantity of particulate matter carried by the gases.

Such kiln assembles require a thick refractory lining, usually of a castable refractory, to retain the heat in the kiln, and protect the metal kiln walls from oxidation, corrosion or warping. Castable or brick refractory linings, particularly liners in chain systems, are subject to severe mechanical stresses and strains as well as heavy abrasion from the continuous sliding of the chains and raw materials.

In addition, the conditions prevailing during the placing of the refractory are often far from ideal, often resulting in premature failure.

Because castable refractories are installed wet, like concrete, they require long, slow start-up procedures, which are costly in terms of lost kiln production.

Refractory linings, whether cast or not, often fail due to stresses induced by bending, flexing or twisting of the kiln.

'Inward' and 'outward' herein refer to radially inward and outward directions in the cylindrical kiln.

This invention provides a metal lining for the refractory so that the refractory is located between the lining and the kiln wall. Although it may well be that metal linings, as so far described, have been previously used on kilns, it is desired to describe some intrinsic advantages before proceeding to the other distinguishing features of the invention. The metal lined kiln may be provided with a thinner lining: that is the refractory plus metal lining may be thinner and have the same heat retention qualities as the unlined refractory. This effectively increases the internal kiln size for the same kiln cylinder thus increasing kiln production capacity. The metal liner reduces abrasion and damage to the refractory. The metal liner acts as a heat exchanger between the gases and the particulate matter. It thus provides improved heat exchange or replaces some of the chains to provide the same heat exchange as with the previous, unlined refractory.

With a continuous metal refractory lining however differential heating and cooling would render such device inoperable because of the differential expansions and contractions of the kiln and liner walls.

The invention therefore provides a number of separate spaced steel plates (preferably rectangular) which collectively make up the liner. Each plate is connected to a single hanger, preferably but not necessarily centrally located. There is a margin for lateral displacement of the plates relative to one another or to the kiln wall due to differential expansion or contraction. It does not matter if, as a consequence of such differential expansion, there are cracks between plates which might allow particulate material to reach the kiln walls. The insulation below the plates is preferably in the form of commercially available insulating batts. The plates are built with support preferably at opposed edges of the plate resting on the kiln walls. However, such support allows relative lateral sliding movement between the plates and the kiln walls. Thus, each plate is only centrally anchored and differential expansion and contraction: (a) relative to the other plates and (b) relative to the kiln walls, may take place because of the single anchor and the spacing between the plates. On the other hand, the single anchored self-supported spaced plates provide protection for the insulation between the plates and the kiln walls and provide heat exchange between the particulate matter and the gases, which heat exchange performance may be added to the heat exchanging performance of any chains in the kiln.

It is noted that the invention extends to the use of the single anchor-spaced hangers with a cast refractory underneath although the use of insulation batts is preferred.

It is a feature of one aspect of the invention that the hanger is provided with welded means for maintaining the plates in place which avoid exposure of the (preferably) heat-treated steel liner plates to the welding temperature. Thus, the hanger projects through an aperture in the plate and means are provided to weld plate-retaining means to the hanger so that the welding heat does not affect the properties of the treated plate.

In one aspect of the invention a retaining means is welded to the projecting portion of the hanger to prevent movement of the plate outwardly. Although this may, within the scope of the invention, be done radially inward of the inward surface of the plates, the retaining means and weld are subject to abrasive action from the particulate material passing through the kiln and (if present) of the chains, thus shortening the life of the retaining means. Accordingly, it is preferred to create opposed inwardly facing recesses between the plate and the hanger, in which the welded retaining means is contained.

The term 'weld' is used herein in two meanings. As a verb it means the welding process as conventionally known and understood. As in the usage 'weld material' it is used to refer to the material (usually the same steel as the host metal) attached to the host steel by the welding process.

The retaining means must however be attached by welding without the welding heat causing heat hardening of the plate which would tend to make it crack in use.

In one aspect the retaining means is a body made of the weld material itself welded to the hanger and bearing on the plate to prevent its movement off the hanger. The hanger adjacent the weld is provided with a coating of refractory material (usually in tape sheet or coating form) of low thermal conductivity in the area adjacent to the weld to protect the plate from heat hardening during the welding of the retaining means to the hanger. Preferably the plates are shaped about the aperture so that the weld material is contained in the recess formed between plates and hanger and the tape sheet or coating is on the part of the plate helping to define the recess.

In another aspect of the invention an added member of steel is welded to the hanger to retain the plate but not welded to the plate. The heat dissipation of the welding heat takes place through the hanger and is distributed through the added member of metal and along the plate rather than concentrated in the one spot. Preferably the plate is designed to form a recess with the hanger as described in the previous paragraph and the added member is shaped to fill the recess and welded to the hanger but not to the plate. The use of the recess reduces abrasion damage to the retaining means by particulate material and chains.

Figure 2:
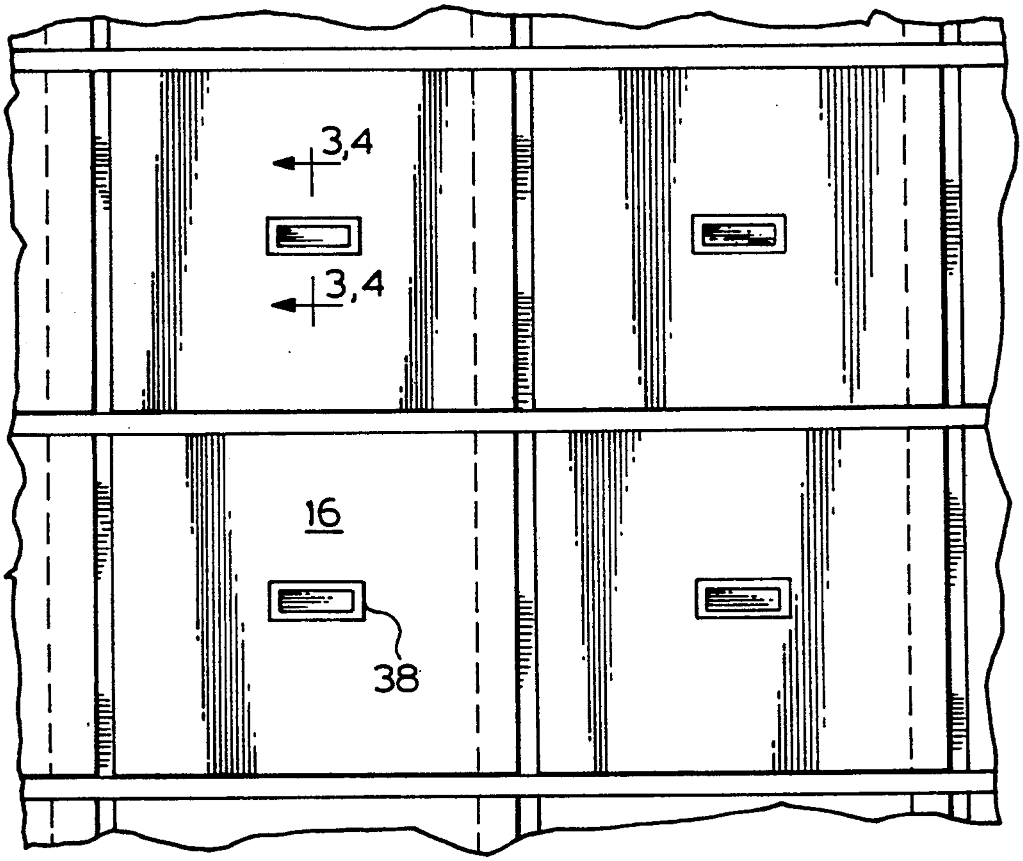
Figure 3:
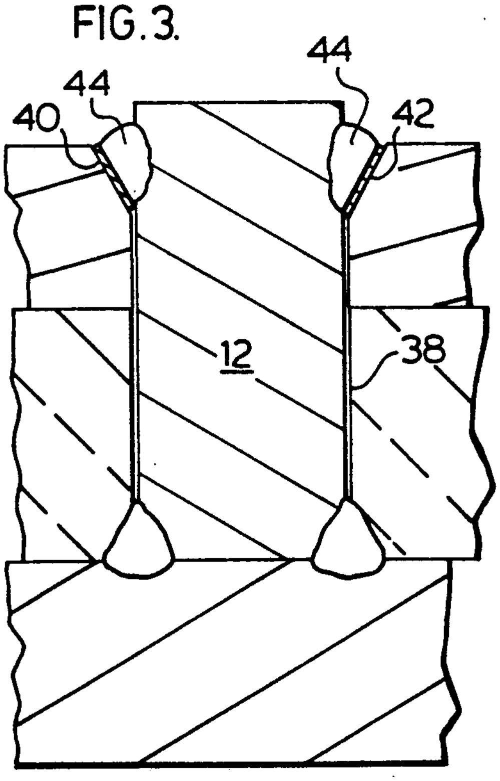
Figure 4:
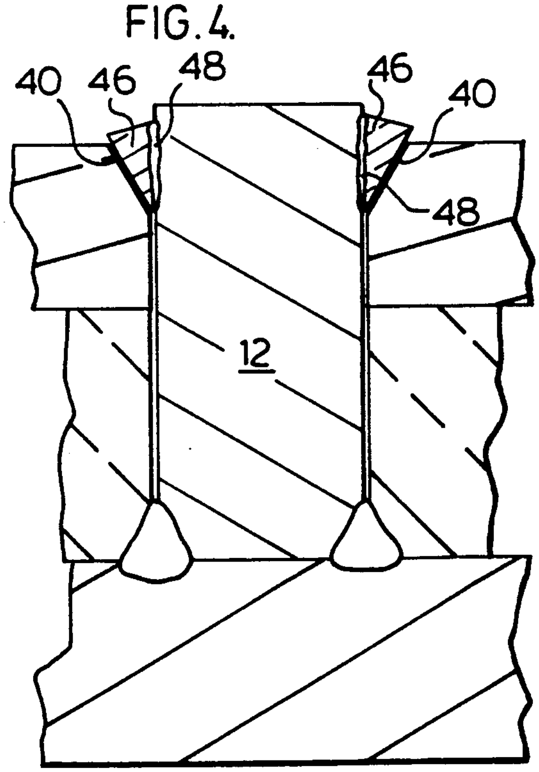
Figure 5:
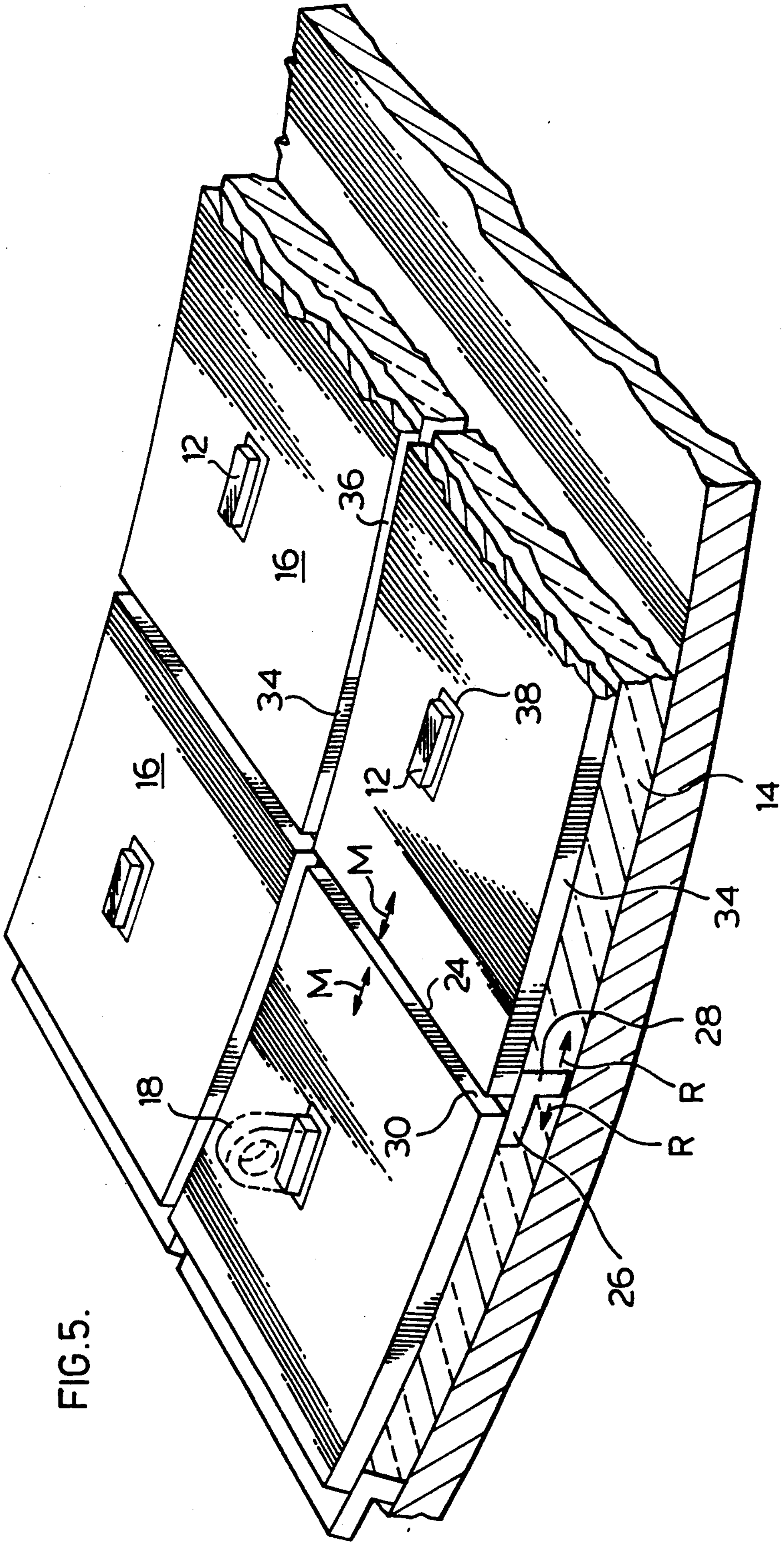

In drawings which illustrate a preferred embodiment of the invention:

FIG. 1 shows a portion of a kiln with liner plates in accord with the invention, FIG. 2 shows four liner plates in place, FIG. 3 shows an enlarged section of one form of the invention taken along the lines 3—3 of FIG. 2, FIG. 4 shows an enlarged section of another form of the invention taken along the lines 4—4 of FIG. 2, FIG. 5 is a perspective view of liner plates incorporating the invention, FIGS. 6–9 show the assembly of the kiln liner and are radial sections.

The drawings show a steel kiln with cylindrical wall with inside surface 10. Welded to the inside surface are steel hangers 12 to project radially inwardly relative to the axis of the kiln. Insulation batts 14 preferably made of and conforming in their curved attitude to the kiln wall as shown and hereinafter described, are apertured to slide over the hanger 12 and rest in a curved attitude on the kiln wall 10 as shown. We prefer to use the batts manufactured by the Carborundum Company, P.O. Box 808, Niagara Falls, N.Y., 14302.

Hangers 12 may be used merely to retain the plates to be described and hangers 18 are provided with an apertured ear to allow suspension of the chains shown in FIG. 1.

Plates 16 are of generally rectilinear shape and may be curved to conform to the inner surface of kiln wall as lined by the curved batts. The plate 16 is a panel 16 which may be of slightly curved shape to conform to the desired shape of the bat inner surface when lying on the kiln wall.

The plates are shaped to be supported by the kiln wall so that there is none or minimal pressure of the plate on the batt. The support will allow sliding of the plate extremities relative to the kiln wall as indicated by arrows R except at the hanger connection to the plate to allow for differential expansion and contraction between each plate and the kiln wall and between plate and plate as indicated by the arrows M.

There are numerous ways of achieving the above described plate support but the preferred method is now described.

The plate 16 may be flat and rectangular, or perhaps curved slightly to conform to the curvature of the kiln walls with the bats thereon. At a corresponding edge 24 in each plate an angle is welded parallel to the plate edge and outwardly therefrom. The angle is welded with one web 28 extending radially outwardly from the lower plate surface to contact and slide on the kiln wall, to form the support for one edge 24 of the plate. The other web 26 of the angle overlaps the plate edge 30, of the circumferentially adjacent next plate which rests thereon. It will be seen that, by this arrangement, the plates are supported at the desired spacing from the kiln to receive the batts 14 therebetween. Thus the batts 14 while generally conforming to the slope of the plate will be slightly lessened dimension than the plate to fit between supports 28 and to generally extend to the side edges 34, 36 of the plates in the axial direction.

The hangers act to locate the plates relative to the kiln and each other. The hangers are placed to provide a required spacing between the adjacent edges 24 and 30 of adjacent plates to tolerate the dimensional changes caused by expansion and contraction of the plates without buckling caused by interference during expansion and without the plate at edge 30 falling off the supporter web 26 of the circumferentially adjacent plate during contraction. The hangers are placed, axially along the kiln, to provide the desired edge spacing between axially adjacent edges 34 and 36 of axially adjacent plates. The edge spacing will allow the required expansion of the plates axially. It is not found important to the operation of the kiln that some particulate material may reach the kiln walls between edges 36 and 34 of axially adjacent plates or between the plate surfaces of circumferentially adjacent plates.

The hanger attachment to retain the plates in place is now to be discussed. However, it may be convenient to note here that in some cases with the inventive attachment, the plate 16 might become loose on the hanger, while retained thereon so that the kiln was still operable. Thus, the edge spacing between edges 24 and 30 or between edges 36 and 34 of adjacent plates should be selected to allow for such incidental movement of the plates. The overlap between each edge 24 and edge 30 should also be selected to allow for such incidental movement without any edge 30 falling off the support provided by the next adjacent plate web 26.

The hangers may preferably be attached to the plates in one of two ways. It was noted that such attachment should not be inward of the inner plate surface to lessen the possibility of damage by particulate matter or chains.

The aperture 38 in the plates is usually rectangular with a suitable tolerance over the hanger section of similar shape. Opposed edges of the inner surface of the plates bordering the aperture are chamferred to provide faces 40 sloping radially inwardly and away from the hanger at about 35°–45° to face the hanger (effectively widening the outer part of the plate aperture) and to define inwardly facing wedge shaped niches with the facing side walls of the hanger.

In one preferred mode of attachment (FIG. 3) the chamferred surface 40 of the plate is covered with heat resistant low conductivity material preferably in the form of tape sheet or coating 42 which is presently commercially available. As the refractory sheet we prefer to use the alumina paper sold under the Trade Mark FIBRE FRAX attached by alumina cement, both products being manufactured by Zircar Products Inc., 110 North Main Street, Florida, N.Y., 10921. The plate is then welded to the hanger so that the weld material 44 is contained or largely contained in the niche. Because of the protective sheet the weld material attaches to the hanger but not to the plate which is nevertheless held in place by the presence of the weld material. More importantly however the presence of the protective layer 42 prevents the (usually) specially treated steel plates 16 from being hardened (leading to possible future fracture) by the heat of the welding.

In the other preferred aspect of the invention shown in FIG. 4 there are provided wedge shaped inserts 46 of suitable steel (for welding to the hanger). The inserts are shaped to fill the niche and may project a small distance outside. The inserts are welded to the hanger at 46 but not to the plate 16 although they act to retain the plate in place. Although a protective coating could be used, the localized heat of welding the insert 46 to the hanger 12 is usually sufficiently dissipated along the hanger, the insert and the weld material already in place to avoid damage to the plate hardness.

The fact that the majority of the insert 46 and the weld is contained in the niche reduces its exposure to the abrasive forces of particulate material and chains.

Either retaining means, located in a niche is considered to be 'located inwardly of the plates' for the purposes of the claims herein.

The chamferred surfaces 40 of the plates may be replaced with any other plate shaping which provides recessed plate surfaces with radially inwardly directed components which may bear on the hanger-attached retaining means. However chamferred surfaces appear the most practical to provide.

Figure 6:
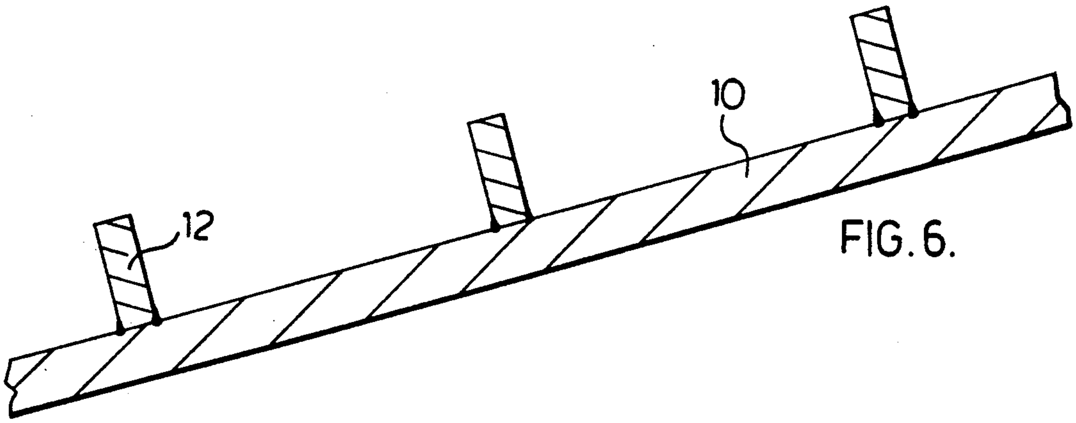
Figure 7:
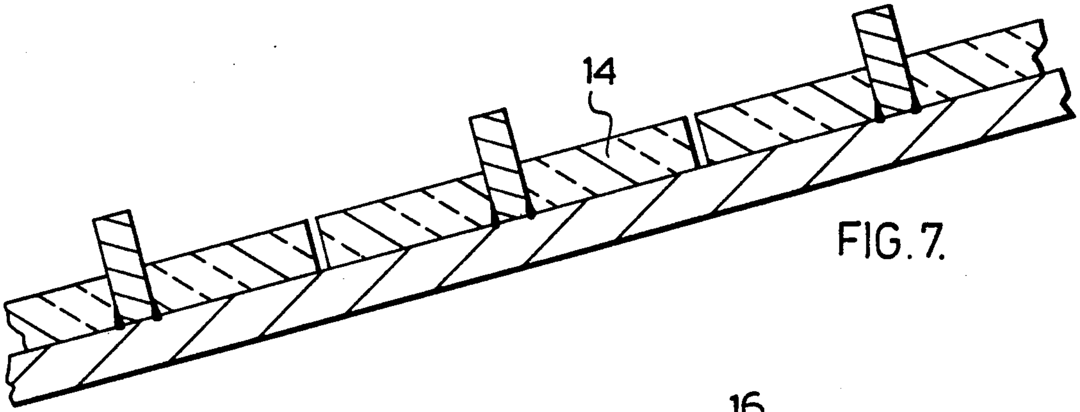
Figure 8:
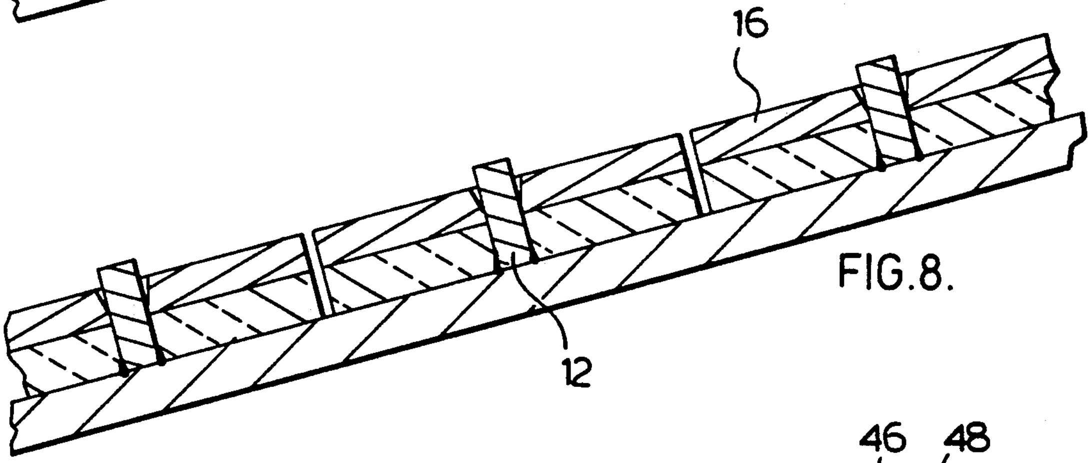
Figure 9:
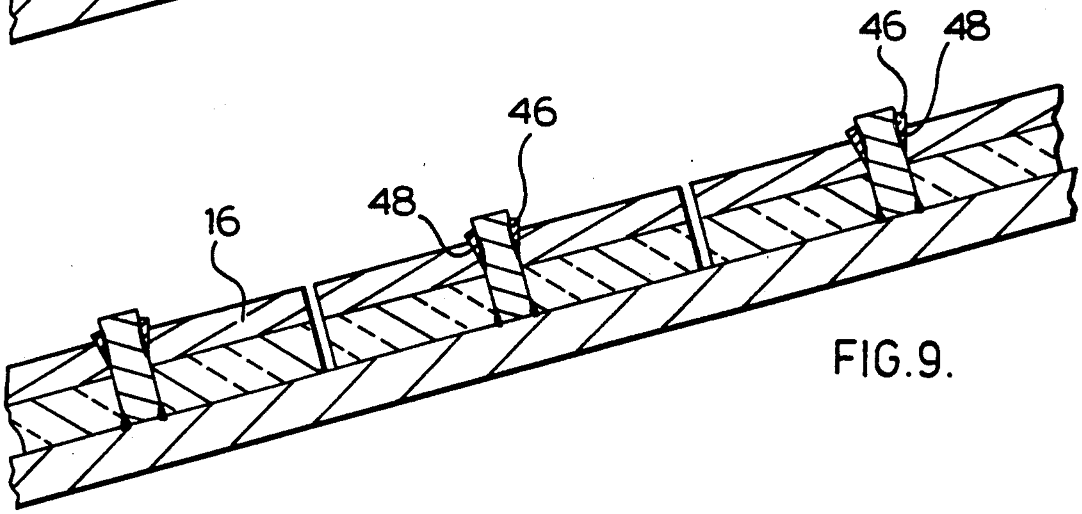

In the construction of the inventive kiln assembly any existing hangers on the kiln wall normally have to be removed since they will not be in the right array or spacing leaving the bare kiln wall of 10 FIG. 6. The new hangers 12 are welded in place as indicated in FIG. 6 with the desired array and spacing in mind. Insulation batts 14 apertured with the dimensions of the plates 16 and supports 28 in mind, are placed on the hangers (FIG. 7). The plates 16 are then placed on the hangers, FIG. 8. The selected method of welding attachment of the plates 16 to the hangers 12 (usually one of the two already described) is used. (The alternative of FIG. 4 is shown in FIG. 9). If chains (shown only in FIG. 1) are to be attached to the hangers or some of them, these are then attached by shackles. The kiln is then complete. The insulating value of the batts 14 with the protection of the plates 16 is such that the thickness of batts plus plates is less than the prior art cast-insulation layer thus effectively increasing the kiln capacity. The action of the plates in protecting the refractory or insulation batts and providing heat exchange between gases and particulate material has already been described. The single anchor for the plates allows them to expand and contract relative to each other and to the kiln without warping or damage to kiln or plates.

Although the plates are shown as having (outside of the niches) a smooth inwardly facing surface the plates may also have any inward contour such as raised edges to provide dams, lifters or the like.

FIG. 5 shows one method of supporting the plates 16 over the batts. Alternatives such as webs at opposite ends of each plate or four legs, or other alternatives may be used.

We claim:

1. Method of forming kiln liner on a cylindrical steel kiln wall having steel hangers extending generally radially inwardly therefrom,
- applying insulating material to a predetermined thickness less than the inward extension of said hangers,
- applying an apertured metal plate over each of a plurality of said hangers with said apertures receiving said hangers, so that said metal plates overlie said insulating material,
- affixing a means to said hanger inwardly of said metal plate to retain the metal plate in position without substantially altering the metallurgical qualities of said plate,
- wherein affixing is performed by welding retaining means to the portion of a hanger inwardly of said plate to retain said plate against outward movement relative to said hanger,
- portions of said plate being free to move under thermal effects relative to said kiln except where attached to said hanger.

2. Method as claimed in claim 1, the inner side of said plates having chamferred aperture edges thereby providing a niche between said hanger and said metal plate,
- affixing said means to said hanger in said niche.

3. Method as claimed in claim 2 including the step of providing steel wedge members having two surfaces complementary to said niche and welding said members to said hanger without welding said members to said plate.

4. Method as claimed in claim 1 wherein the inner sides of said plates have chamferred aperture edges,
- and coating said edges with heat resistant material and welding a retaining means to said hanger contacting said heat resistant layer.

5. Method of forming kiln layer on a cylindrical steel kiln wall having steel hangers extending generally radially inwardly therefrom,
- applying insulating material to a predetermined thickness less than the inward extension of said hangers,
- applying an apertured metal plate over each of a plurality of said hangers with said apertures receiving said hangers, so that said metal plates overlie said insulating material,
- affixing a means to said hangers inwardly of said metal plate to retain the metal plate in position without substantially altering the metallurgical qualities of said plate,
- the inner side of said plates having chamferred aperture edges thereby providing a niche between said hanger and said metal plate,
- affixing said means to said hanger in said niche,
- and including the step of providing steel wedge members having two surfaces complementary to said niche and welding said members to said hanger without welding said members to said plate.

6. Method of forming kiln layer on a cylindrical steel kiln wall having steel hangers extending generally radially inwardly therefrom,
- applying insulating material to a predetermined thickness less than the inward extension of said hangers,
- applying an apertured metal plate over each of a plurality of said hangers with said apertures receiving said hangers, so that said metal plates overlie said insulating material,
- affixing a means to said hangers inwardly of said metal plate to retain the metal plate in position without substantially altering the metallurgical qualities of said plate,
- wherein the inner sides of said plates have chamferred aperture edges,
- and coating said edges with heat resistant material and welding a retaining means to said hanger contacting said heat resistant layer.

* * * * *